Patented June 14, 1932

1,863,266

UNITED STATES PATENT OFFICE

ROSCOE H. CARTER, OF WASHINGTON, DISTRICT OF COLUMBIA

PROCESS FOR THE MANUFACTURE OF INSECTICIDES AND METHOD OF MAKING SAME

No Drawing. Application filed November 15, 1929. Serial No. 407,553.

(GRANTED UNDER THE ACT OF MARCH 3, 1883, AS AMENDED APRIL 30, 1928; 370 O. G. 757)

This application is made under the act of March 3, 1883, amended April 30, 1928, and the invention herein described, if patented, may be manufactured and used by or for the Government for governmental purposes without payment to me of any royalty thereon.

I hereby dedicate the invention herein described to the free use of the public, to take effect upon the granting of a patent to me.

This invention relates to methods of making double fluorides and it comprises methods of making double fluorides and products thereof; such products being of a light and fluffy nature and containing double fluorides and silica and being in the form of dried gels; wherein water soluble aluminum compounds are treated with alkali metal compounds in the presence of water and aqueous hydrofluosilicic acid in the proper molecular proportions and the resultant gel is washed and dried by any suitable means and it also comprises as a new composition of matter for insecticidal and other purposes dried gels containing double fluorides and silica and also dried gels containing double fluorides, silica and alumina all as more fully hereinafter set forth and as claimed.

Several of the fluorine compounds are useful insecticidal materials and are in use commercially for such purposes. However, their use is limited to a considerable extent by their physical and chemical properties. Many are too insoluble to possess the proper toxicity to the insects against which they are employed while the more soluble ones cause foliage injury. The fluosilicates in particular have been investigated for their insecticidal value and have been found dangerous to foliage due to their solubility and the acid reaction of their solutions. The physical condition of many of the common fluorine compounds also renders them unsuitable as insecticides because of their dense and crystalline form.

Fluorine is available in large quantities as a by-product in waste gases from industrial operations as in the manufacture of superphosphate fertilizer. When such waste gases containing silicon fluoride are conducted through water there is formed the hydrofluosilicic acid of commerce according to the equation

$$3SiF_4 + 4H_2O = 2H_2SiF_6 + SiO_2 + 2H_2O.$$

I have invented a new and useful process for the ultilization of this hydrofluosilicic acid in making compounds which are useful as insecticides and possess advantages over methods and products now in use.

In my investigation I have found that when a water soluble salt of aluminum is treated with a water soluble alkali metal compound in the presence of water and hydrofluosilicic acid in the proper molecular proportions and heated they react to form the insoluble double fluoride of the metal with aluminum and simultaneously there is produced hydrated silica both as gelatinous colloidal precipitates which can be filtered off, washed and dried to a fine white powder containing the double fluoride and silica in equimolecular proportions. Considerable amounts of the double fluoride of potassium and aluminum $K_3AlF_6$ mixed with equimolecular amounts of $SiO_2$ have been made in the laboratory by the following procedure.

Aluminum sulphate $[Al_2(SO_4)_3.18H_2O]$ and potassium hydroxide (KOH) were mixed in a small amount of water and hydrofluosilicic acid ($H_2SiF_6$) added with stirring. Considerable heat was generated from the reactions and more heat was applied to bring the reaction mixture to boiling at which temperature it was maintained for 20 to 30 minutes. A gelatinous gel was formed which was filtered off, washed and dried to a fine white powder. Yields as high as 90 per cent of the theoretical amount of $K_3AlF_6$ and $SiO_2$ were obtained and analyses agreed closely with the theoretical percentages of the different constituents. The molecular proportions of the components are illustrated by the equation $Al_2(SO_4)_3.18H_2O + 12KOH + 2H_2SiF_6 = 2K_3AlF_6 + 2SiO_2 + 3K_2SO_4 + 26H_2O.$ In this reaction may be substituted other water soluble salts of aluminum (as the chloride, potassium or sodium alum, etc.) or other alkali metal compounds as potassium or sodium carbonate, bicarbonate, oxides or per-oxides, etc., which give an alkaline reaction to their aqueous solution. The dried gel obtained as a final product in the case of the potassium hexafluoaluminate was a white powder relatively insoluble in water giving crystals of a definite form from evaporation of an aqueous solution and possessing definite insecticidal value. This product has lower apparent density and is a more fluffy powder than the same product made from hydrofluoric acid due to the admixture of silica produced simultaneously. Hydrated alumina may also be produced simultaneously with the hydrated silica and the double fluoride by using the aluminum salt and the alkali in excess of the quantities indicated by the foregoing equation, but in equivalent proportion to each other to form the aluminum hydroxide. When properly made and washed these products are neutral or slightly alkaline in reaction to indicators.

The amount of water used in these reactions is apparently not of any particular importance. I have found a convenient amount to be about 8 to 10 liters for 1,000 grams of aluminum sulphate and other reagents in the proper molecular proportions. The heat generated by mixing these chemicals is nearly sufficient to raise that amount of water to the boiling point so that not much more is required to complete the reaction. Time of heating also is not of considerable importance except that long continued digestion at high temperature tends to hydrolyze the double salt. Washing and filtration by any suitable means are carried out and drying was effected on the steam bath and then in an electric oven at 100 to 110° C. When properly made and dried the compound requires little grinding to reduce it to a powder.

I claim:

1. The process of making insecticidal preparations containing silica and the water-insoluble double fluorides of the alkali metals with aluminum which comprises bringing together in the presence of water, a water soluble salt of aluminum, an alkali metal compound and hydrofluosilicic acid all in the proper molecular proportions wherein is precipitated the insoluble double fluoride and silica intimately mixed.

2. The process of making insecticidal preparations containing double fluorides of the alkali metals with aluminum wherein is produced simultaneously the double fluoride, hydrated silica and hydrated alumina, intimately mixed, which comprises bringing together, in the presence of water, a water soluble salt of aluminum, an alkali metal compound, and hydrofluosilicic acid, the aluminum and alkaline salts being in excess of the amounts required to react with the hydrofluosilicic acid, but in such relation to each other as to produce alumina.

3. As new insecticidal preparations, the complex products of the reactions between aqueous solutions of one mole of aluminum sulphate, twelve moles of potassium hydroxide, and two moles of hydrofluosilicic acid, such reaction products consisting principally of the water insoluble double fluoride of the alkali metal compounds with aluminum, intimately and inseparably mixed wtih hydrated silica.

4. As new insecticidal preparations, the complex products of the reactions between aqueous solutions of an aluminum salt, an alkali metal compound and hydrofluosilicic acid, each reactant being present in such concentration as to furnish one combining weight of aluminum, six combining weights of the alkali metal and six combining weights of fluorine, respectively, such reaction products consisting principally of the water insoluble double fluoride of the alkali metal compound with aluminum, intimately and inseparably mixed with hydrated silica.

5. As new insecticidal preparations, the complex products of the reactions between a water soluble salt of aluminum, an alkali metal compound and hydrofluosilicic acid in the presence of water, the aluminum and alkaline salts being in excess of the amounts required to react with the hydrofluosilicic acid, but in such relation to each other as to produce hydrated alumina, intimately and inseparately mixed with hydrated silica and the insoluble double fluoride.

ROSCOE H. CARTER.